United States Patent

[11] 3,603,238

[72] Inventors Arthur H. Anderson
195 W. 39th. Ave., Eugene, Oreg.;
Roger A. Fox, 2405 N. 35th., Springfield, Oreg. 97477
[21] Appl. No. 41,207
[22] Filed May 28, 1970
[45] Patented Sept. 7, 1971

[54] PRESSURIZING DEVICE FOR MOBILE UNITS
8 Claims, 5 Drawing Figs.
[52] U.S. Cl. .................................................. 98/64, 98/14, 55/498, 55/510
[51] Int. Cl. .................................................. F23l 17/02
[50] Field of Search ............................................. 98/60, 61, 62, 64, 10, 13–15; 55/330, 385, 471, 498, 510

[56] References Cited
UNITED STATES PATENTS
1,879,450 9/1932 Palmer ........................... 98/61 X
3,361,051 1/1968 Fair et al. ....................... 98/58

Primary Examiner—Edward J. Michael
Attorney—James D. Givnan, Jr.

ABSTRACT: A fan and air filter for disposition on the wall of a camper or vacation trailer and directing a flow of filtered air into said unit thereby pressurizing the unit to preclude the entry of road dust. A circular disposable filter of the dry type is mounted in a removable manner about a fan and motor combination with both the filter and motor being concealed by a housing having air inlet openings along its rearwardly extending surface. A baffle wall of a nonconstant height is of circular shape with an upright outer surface against which water droplets are deposited during an abrupt change of direction in the intake airflow. Means are provided permitting the removal of the water so collected.

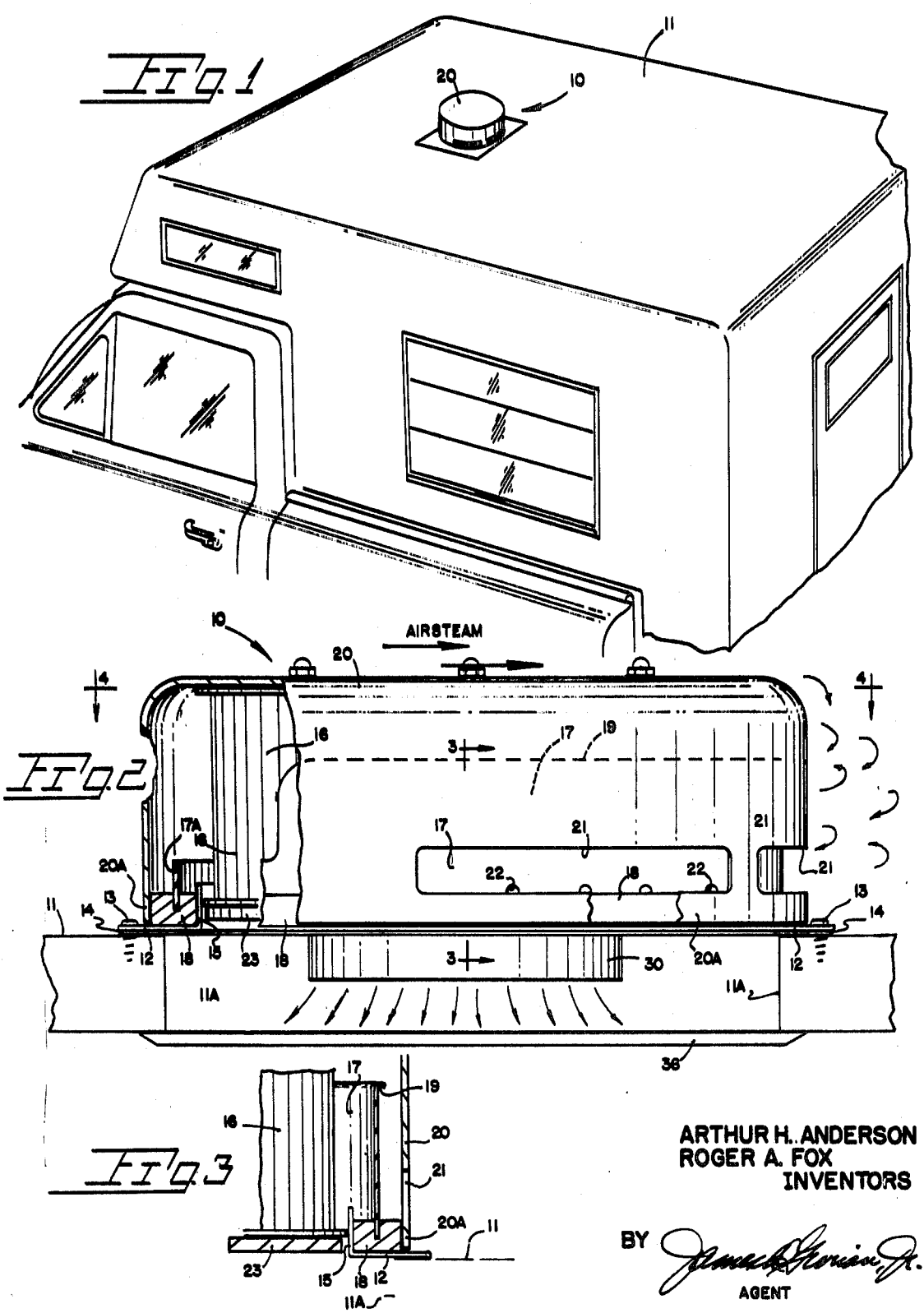

PATENTED SEP 7 1971 3,603,238

ARTHUR H. ANDERSON
ROGER A. FOX
INVENTORS

BY *James Thurman Jr.*
AGENT

PRESSURIZING DEVICE FOR MOBILE UNITS

BACKGROUND OF THE INVENTION

The present invention relates generally to ventilating devices and more particularly to a ventilating device for the pressurizing of a mobile living unit to prevent entry of dirt laden air into the unit through seams or other openings in the units structure.

In the travelling over unpaved roads mobile living units, such as campers and vacation trailers are subjected to considerable amounts of road dust with the dust gaining entry into the unit regardless of the windows of the unit and other openings being securely closed. The dust is extremely fine and gains entry into the nonairtight units through seams in its structure and door and window edges or vent openings. It is not uncommon after a trip through a dusty area to have a considerable deposit of road dust within the unit and on personal belongings therein.

With regard to the prior art, the well known mobile air conditioning units presently in use for automotive vehicles do not lend themselves in a practical manner for use with a mobile living unit. Further, the high cost of such presently available units restricts their use.

SUMMARY OF THE INVENTION

The instant invention is embodied within a device for placement on the exterior of a mobile living unit for the purpose of providing a continuous flow of filtered air of a substantial volume into said unit. The substantial air flow results in a positive air pressure within the unit resulting in an outward flow of air from the nonairtight unit which flow is through openings existing in the trailer structure. A removable filter is included in the device readily accessible for changing same and further a baffle is provided to assure moisture removal from the incoming air. The housing of the device is of a shape conducive to efficient air intake throughout the range of normal driving speeds.

It is a primary object of the present invention to provide an adequate volume of filtered air into a moving mobile living unit to assure an outward flow of filtered air from the unit past doors, window edges, and seams, which exist in all such structures and which otherwise permits the entry of dust laden air. Road dust is accordingly prevented from entering the living quarters.

A further object of the present invention is to provide for the utilization of low cost readily available automotive air filters which can be changed by the unit owner in a convenient manner. Such filters are in common use as automotive carburetor air filter inserts.

A further object is the provision of a housing with openings located therein for the entry of air from the air stream past the vehicle in a manner avoiding the intake of water droplets in the air. Associated with this feature is an upright baffle causing an abrupt change in the path of the incoming air causing impingement of any water droplets therein against the baffle. Collection and removal of the water is also provided for in a novel manner.

A further object resides in the present device also functioning as a ventilating unit when it is desired to circulate air through a stationary mobile living unit.

A still further object is the provision of a pressurizing device for use on mobile units readily mountable within the standard vent opening existing in the unit. Accordingly removal of the existing vent structure permits convenient placement of the present device therewithin without costly modification of the mobile unit.

BRIEF DESCRIPTION OF THE DRAWING

In the accompanying drawing,

FIG. 1 is a perspective view of a camper constituting a mobile living unit with the present device disposed on its roof surface, FIG. 2 is a side elevational view of the present device with fragments broken away for purposes of illustration and with a fragment of the camper roof structure shown, FIG. 3 is a sectional view taken along line 3—3 of FIG. 2 showing details of the base and baffle structure of the present unit.

DESCRIPTION OF PREFERRED EMBODIMENT

Figure 4:
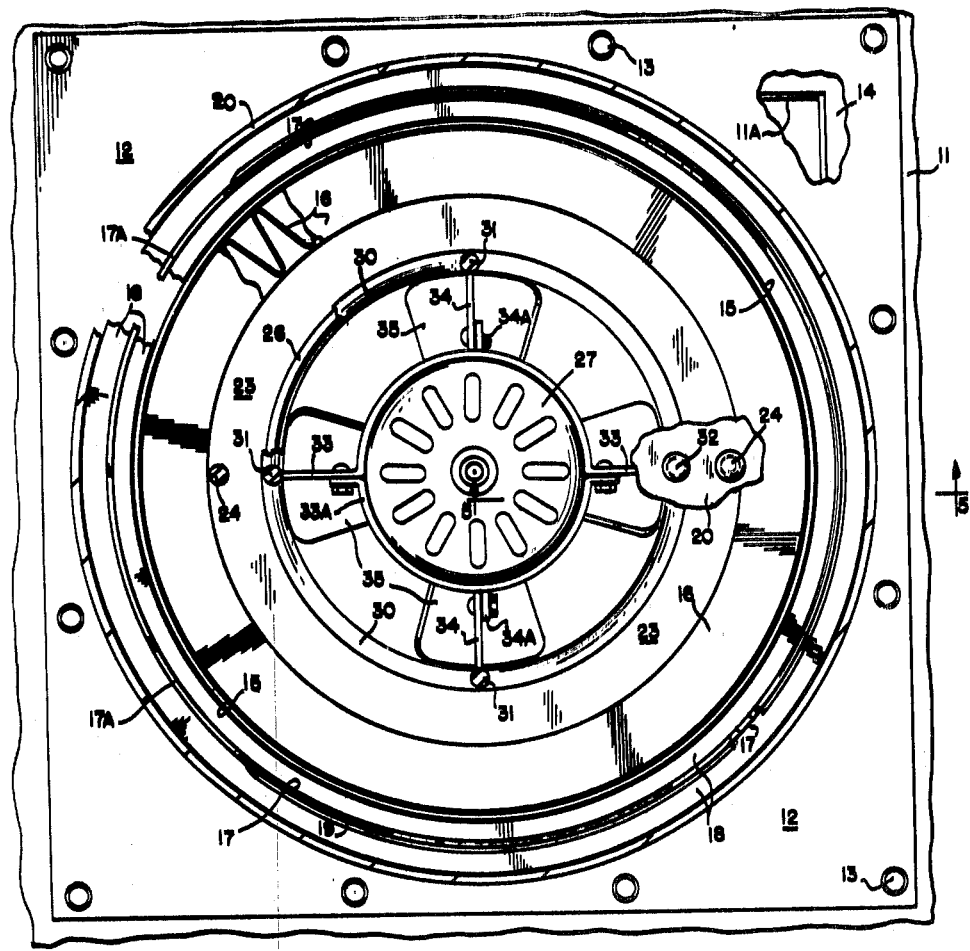
FIG. 4 is a horizontal plan view of the device taken along line 4—4 of FIG. 2.
Figure 5:
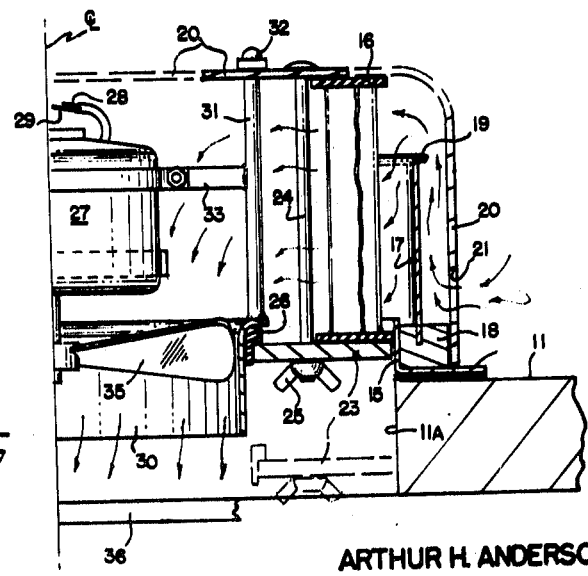
FIG. 5 is a vertical sectional view taken approximately along line 5—5 of FIG. 4.

With continuing reference to the accompanying drawing wherein applied reference numerals indicate parts similarly identified in the following specification, the reference numeral 10 indicates generally the present pressurizing device in place on a roof surface of 11 of a camper body. The camper illustrated is typical of other types of mobile recreational living units which, in their use, may travel unpaved, dusty roads.

The roof structure of such units commonly includes a standard size opening 11A therein for placement of an adjustable louvered vent.

A base 12 is secured to the roof structure 11 as by sheet metal screws 13 with a resilient gasket 14 therebetween. The base 12 includes an upwardly directed annular wall 15 which positions a circular air filter assembly 16. A circular baffle wall 17, shown both in FIG. 2 and in FIG. 3, extends upwardly from a ring member 18 with its function being later described in detail with other components. The baffle is of a reduced height at 17A about a forwardmost arc to avoid undue restriction of the airflow to the filter 16. An upper edge 19 of the baffle wall 17 is slightly rolled to retard water droplet passage thereover.

A circular housing 20 for the device has its lower periphery 20A in closely fitted engagement about the ring member 18. Adjacent the lower periphery 20A of the housing and extending about approximately the rearward half of the housing are air intake openings 21, with the term rearward being used with respect to the direction of vehicle travel resulting in the air stream being as indicated in Figure 2. Accordingly the inlet air is for the most part drawn in from the area where burbling or random air currents occur. The lower edges of the air intake openings 21 are coplanar with the upper surface of ring member 18 to permit the draining of water collected against the baffle wall 17. For draining purposes baffle openings at 22 permit the outward flow of water past the baffle.

Air filter assembly 16 upon being upwardly inserted into the present device seats against the underside of housing 20 while its lower edge engages, in an airtight manner, the annular wall 15 of the base 12. The filter 16 is inwardly spaced from baffle 17 with the latter being of a suitable height to collect water droplets from the intake air prior to filter passage.

A retainer ring 23 in cooperation with depending supports 24 and wing nut 25 positions filter 16 securely in place. A resilient member 26 serves to reduce motor noise as later described. Replacement of the air filter, which is commercially marketed as a dry type, carburetor air filter assembly, entails simply the removal of retainer ring 23 with a replacement being readily and inexpensively available at any service station. The filtering of such filters is through a paper element of serpentine configuration.

Centrally disposed in the present device is a fan motor 27 of appropriate voltage with leads 28-29 to the automotive electrical system circuited through suitable switch controls not shown. A motor fan assembly further includes an annular duct 30 suspended by arcuately spaced hangers 31 which terminate upwardly in bolted securement at 32 with housing 20. Resilient member 26, earlier mentioned, fits about duct 30 to confine same against vibrational displacement. Horizontal motor supports at 33-34 are vertically spaced and extend about the motor case with cooperating motor clamps at 33A-34A in bolted attachment with their respective supports. Motor access, if and when maintenance is necessary, is conveniently accomplished by removal of the four nuts at 32 subsequent to removal of retainer plate 23. A four bladed fan is indicated at 35 exhausting downwardly through opening 11A, past a ceiling register 36 in the mobile living unit.

In use the device is primarily intended for operation while the mobile unit is traveling dusty roads to prevent the entry of dust laden air. If desired, the motor utilized may be of the reversible type which by means of suitable switch control may be used to exhaust air from unit when the unit is immobile.

Having thus described our joint invention what we desire to secure under a Letters Patent is:

1. A device for pressurizing the interior of a mobile living unit with a flow of filtered air into the unit preventing the entry of ambient dust laden air, said device comprising,
   a base for installation on an exterior wall surface of the unit,
   a housing supported on said base,
   motor and fan means within the housing,
   a circular disposable air filter assembly disposed about said motor and fan means,
   retainer means positioning said filter assembly within the housing, and
   a baffle spaced intermediate the housing and the filter and adapted to upwardly direct the airflow so as to cause impingement of any water droplets in the inlet air on said baffle.

2. The device as claimed in claim 1 wherein said retainer means is removably carried within said housing.

3. The device as claimed in claim 1 wherein said housing is adapted to admit inlet air from an area of turbulent ambient air rearwardly adjacent the housing which area is normally occupied by random air currents while the living unit is underway.

4. The device as claimed in claim 1 wherein said baffle comprises an upright annular wall.

5. The device as claimed in claim 4 wherein said wall has an arcuate portion of its upper edge terminating in an outwardly rolled edge to retard the passage of water thereover.

6. The device as claimed in claim 5 wherein said wall is of a nonconstant height with the highest portion thereof disposed so as to cause air coming into the housing to be diverted in a perpendicular fashion.

7. The device as claimed in claim 6 wherein said housing is adapted to admit inlet air from an area of turbulent ambient air rearwardly adjacent the housing which area is normally occupied by random air currents while the living unit is underway.

8. The device as claimed in claim 6 wherein said wall defines apertures at spaced apart intervals along its lower edge for the passage of collected water through said wall.